Dec. 6, 1966 P. BARATOFF 3,289,998
ALL-DIRECTIONAL SHOCK MOUNT
Original Filed Nov. 15, 1963
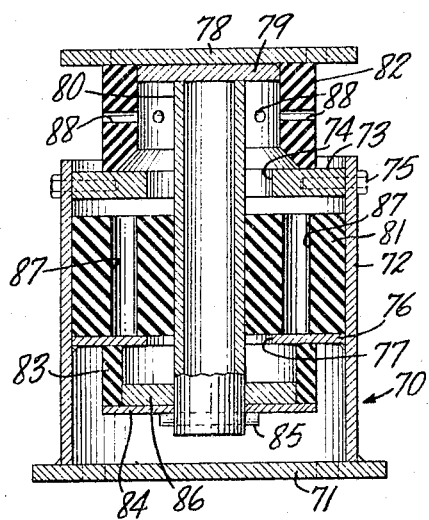
INVENTOR
PAUL BARATOFF
BY
Brumbaugh, Free, Graves &
Donohue
HIS ATTORNEYS United States Patent Office 3,289,998
Patented Dec. 6, 1966

3,289,998
ALL-DIRECTIONAL SHOCK MOUNT
Paul Baratoff, Jackson Heights, N.Y., assignor to Korfund Dynamics Corporation, Long Island City, N.Y., a corporation of New York
Original application Nov. 15, 1963, Ser. No. 323,978, now Patent No. 3,245,646, dated Apr. 12, 1966. Divided and this application Oct. 11, 1965, Ser. No. 494,752
2 Claims. (Cl. 248—358)

This is a division of application Serial No. 323,978, filed November 15, 1963, now Patent No. 3,245,646.

This invention relates to shock mounts and, in particular, to an improved form of all-directional shock mounts capable of attenuating severe shock forces.

Shock mounts that incorporate shock absorbing members formed of an elastomer or similar resilient material, are often constructed by bonding one or more metallic elements of the mount to the resilient members to enable them to attenuate both compression and tension forces. Bonded compressible elements, limited to the strength of the bond, are inherently incapable of accommodating large tension shock loads. Thus there has existed a need for an all-directional shock mount assembled from conventional resilient members and metal parts which do not require special treatment, such as bonding, and which can be accomodate large vertical and horizontal tension and compression forces over long periods.

The present invention satisfies these needs by providing shock mounts that include resilient shock absorbing members disposed to attenuate shock loads from all directions, the displacement of a supported equipment subjecting the members only to compressive forces, and the movements of the equipment additionally being opposed and attenuated not only by internal inherent damping of elastomer material, but also by friction between elements within the shock mount.

More particularly, according to the invention a typical shock mount includes at least three resilient shock absorbing members formed, for example, of rubber or other elastomer: the first of which is subjected to compressive stresses when the supported load moves vertically upward, the second being subject to compressive stresses by movement of the load vertically downward and the third being adapted to attenuate by compression all horizontal shock loads.

For a better understanding of the present invention reference may be had to the accompanying drawing, in which:

FIGURE 1 is a view in vertical section of another shock mount embodying the invention.

A shock mount embodying the invention, shown in FIGURE 1 is formed by a housing 70 comprised of a base plate 71 to which is welded a tubular collar 72. A horizontally disposed upper annular plate 73, provided with a centrally disposed aperture 74, is secured to the tubular collar 72 by screws 75. A horizontally disposed lower annular plate 76, formed with a centrally disposed aperture 77, is also secured to the tubular collar 72 and spaced below the upper plate 73 with the apertures 74 and 77 in general alignment to complete the housing 70.

A support plate 78, spaced vertically above the tubular collar 72, carriers a smaller plate 79 from which extends a shaft 80. The larger apertures 74 and 77 enable the shaft to protrude through the upper and lower plates 73 and 76 in vertical sliding engagement with an annular shock absorbing member 81 compressively interposed between the shaft 80 and the tubular collar 72 and engaging the lower annular plate 76.

An upper shock absorbing ring 82 is disposed between the support plate 78 and the upper annular plate 73, and fits closely over the plate 79. A lower shock absorbing ring 83 is located between the lower annular plate 76 and a flange 84, attached to the lower extremity of the shaft 80 by means of a roll pin 85. A plate 86 on the flange 84 fits closely into the ring of elastomer 83 and holds it in position.

Shock forces compressing the base plate 71 toward the support plate 78 are attenuated by the elasticity of the upper shock absorbing member 82, while shock loads placing the support plate 78 and base plate 71 in tension are attenuated by compressing the lower shock absorbing member 83 between the shaft flange 84 and the lower annular plate 76. Patrial vertical input dissipation is provided by the frictional forces generated between the shaft 80 and the annular shock absorbing member 81.

Horizontal shock forces are attenuated by the compression of a portion of the annular shock absorbing member 81 between the tubular collar 72 and the shaft 80. The frictional forces generated between the upper and lower shock absorbing members 82 and 83 and the upper and lower annular plates 73 and 76, respectively, provide partial dissipation of horizontal shock inputs.

The load rate of the resilient shock absorbing members shown in FIGURE 1 can be varied to a desired value not only by using elastomers of different hardness, but also by drilling in them a desired number of suitably sized vertical or horizontal holes. For example, a plurality of vertical holes 87 have been drilled in the ring 81 and a plurality of horizontal holes 88 have been formed in the ring 82. The lower edge of the ring 82 has also been partially tapered to afford a desired response to vertical shock loads. Of course the stiffness the resilient shock absorbing members also affects the load rate of the shock mounts.

As is apparent from the foregoing, the present invention provides an all-directional shock absorbing device in which the imposed shock loadings are attenuated by both elastic compression and friction forces.

It will be understood that while representative embodiments of the present invention have been shown and described for purposes of illustration, modifications thereof will occur to those skilled in the art. Therefore, the invention is not to be limited to the specific apparatus disclosed herein but is to be defined by the appended claims.

I claim:

1. A shock mount comprising a housing including a tubular member and a pair of plates having openings therein, said plates being fixed to said tubular member in spaced apart, substantially parallel relation, a support plate, a shaft extending from the support plate through said openings in both of said plates, a first shock absorbing ring interposed between and engaging the support plate and one of said parallel plates to attenuate by compression thereof vertical forces tending to urge the support plate towards the housing, a flange on the lower end of the shaft, a second resilient shock absorbing ring interposed between and engaging the flange and the other of said parallel plates to attenuate by compression thereof vertical loads tending to urge the support plate away from the housing and a third shock absorbing ring between said parallel plates and interposed between and engaging the shaft and said tubular member to attenuate by compression of said third ring all horizontal shock loads between the shaft and the housing.

2. A shock mount as defined in claim 1, wherein the third shock absorbing ring frictionally engages the shaft to attenuate vertical shock loads.

References Cited by the Examiner

UNITED STATES PATENTS

| | | | |
|---|---|---|---|
| 1,820,220 | 8/1931 | Geyer | 248—358 X |
| 2,232,667 | 2/1941 | Sauer | 248—358 |
| 2,457,058 | 12/1948 | Markowitz | 248—358 |

CLAUDE A. LE ROY, *Primary Examiner*

JOHN PETO, *Examiner.*